(12) United States Patent
Yasui et al.

(10) Patent No.: US 11,194,029 B2
(45) Date of Patent: Dec. 7, 2021

(54) DISTANCE ESTIMATION DEVICE, MOBILE TERMINAL, DISTANCE ESTIMATION METHOD, AND PROGRAM

(71) Applicant: MITSUBISHI HEAVY INDUSTRIES, LTD., Tokyo (JP)

(72) Inventors: Jun Yasui, Tokyo (JP); Keiichi Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 106 days.

(21) Appl. No.: 16/697,595

(22) Filed: Nov. 27, 2019

(65) Prior Publication Data

US 2020/0309931 A1 Oct. 1, 2020

(30) Foreign Application Priority Data

Mar. 28, 2019 (JP) .............................. JP2019-064213

(51) Int. Cl.
| | |
|---|---|
| *G01S 11/02* | (2010.01) |
| *G01S 5/06* | (2006.01) |
| *G01S 3/48* | (2006.01) |
| *H04J 11/00* | (2006.01) |

(52) U.S. Cl.
CPC ................. *G01S 11/02* (2013.01); *G01S 3/48* (2013.01); *G01S 5/06* (2013.01); *H04J 11/0063* (2013.01)

(58) Field of Classification Search
CPC ............... G01S 11/02; G01S 3/48; G01S 5/06
USPC ......................................... 342/451, 424, 442
See application file for complete search history.

(56) References Cited

U.S. PATENT DOCUMENTS

2013/0310074 A1* 11/2013 Giusto .................. H04W 4/023
455/456.1

FOREIGN PATENT DOCUMENTS

JP 2014-513271 A 5/2014

* cited by examiner

*Primary Examiner* — Bo Fan
(74) *Attorney, Agent, or Firm* — Osha Bergman Watanabe & Burton LLP (57) ABSTRACT

A phase rotation amount of each of subcarriers is calculated by calculating a difference between the first phase difference and the second phase difference between consecutive subcarriers included in radio signals, and performing phase addition processing based on the difference. A characteristic coefficient regarding a change rate of the phase rotation amount of each of the subcarriers with respect to a frequency is calculated by performing a linear regression analysis of the relationship between a frequency and the phase rotation amount, and a distance is estimated based on the characteristic coefficient.

8 Claims, 9 Drawing Sheets

DISTANCE ESTIMATION DEVICE, MOBILE TERMINAL, DISTANCE ESTIMATION METHOD, AND PROGRAM

TECHNICAL FIELD

The present disclosure relates to a distance estimation device for estimating a distance to a transmission source of a radio signal, a mobile terminal equipped with the distance estimation device, a distance estimation method, and a program.

BACKGROUND

Conventionally, in a distance measurement technique such as trilateration using radio signals, a distance is obtained by transmitting and receiving radio signals between a plurality of access points having known coordinates, thereby obtaining the coordinates of an object based on a relative distance to each of the access points. It is therefore necessary to always ensure communication with the plurality of access points if such a distance measurement technique is applied to a moving body such as a vehicle. However, it may be difficult to receive the radio signals from some of the access points depending on a traveling route of the moving body in a reality environment, which may make it difficult to perform steady distance measurement.

As one of solutions to such a problem, for example, Patent Document 1 discloses a distance measurement technique capable of performing distance measurement only by communication with a single access point by using an OFDM (Orthogonal Frequency Division Multiplexing) signal.

CITATION LIST

Patent Literature

Patent Document 1: JP2014-513271A (translation of a PCT application)

SUMMARY

Meanwhile, multipath fading is known as a problem regarding a distance measurement technique using transparent radio signals. Multipath fading causes communication degradation such as fluctuations in reception level generated by randomly reflecting, refracting, scattering radio signals transmitted from some access points by a building or a natural terrain, thereby making the radio signals interfere with each other via a plurality of different paths. Even in a case in which the OFDM signal is used as a radio signal as in Patent Document 1 described above, a distance estimation accuracy may be decreased by fluctuations in reception level of the radio signals interfering with each other due to multipath fading. In addition, distance estimation itself may be difficult if the reception level of the radio signals is buried in a noise level due to multipath fading.

At least one embodiment of the present invention is made in view of the above, and an object of the present invention is to provide a distance estimation device, a mobile terminal, a distance estimation method, and a program capable of suppressing a decrease in distance estimation accuracy due to multipath fading.

(1) In order to solve the above-described problems, a distance estimation device according to at least one embodiment of the present invention is a distance estimation device for estimating a distance to a transmission source of radio signals by receiving the radio signals each including not less than three subcarriers having frequencies different from each other and having oscillation phases equal to each other or with a certain difference, the distance estimation device including a phase acquisition unit which respectively acquires phases of an Mth subcarrier (M is an integer greater than or equal to 1), an (M+1)th subcarrier, and an (M+2)th subcarrier of not less than the three subcarriers, a phase difference calculation unit which calculates, based on an acquisition result of the phase acquisition unit, a first phase difference between the Mth subcarrier and the (M+1)th subcarrier, and a second phase difference between the (M+1)th subcarrier and the (M+2)th subcarrier, a determination unit which determines whether a difference between the first phase difference and the second phase difference is not less than a threshold, a phase addition processing unit which respectively calculates phase rotation amounts of not less than the three subcarriers by performing phase addition processing of adding 360 deg to a phase of an Nth subcarrier (N is an integer greater than or equal to M+1) of not less than the three subcarriers, if the difference is not less than the threshold, a characteristic coefficient calculation unit which calculates a characteristic coefficient regarding a change rate of the phase rotation amounts with respect to the frequencies by performing a linear regression analysis of a relationship between the phase rotation amounts and the frequencies of not less than the three subcarriers, and a distance estimation unit which estimates the distance based on the characteristic coefficient.

With the above configuration (1), continuity of the phases is determined based on a phase difference between consecutive subcarriers of the plurality of subcarriers included in the radio signals. As a result, phase addition processing is performed on phases of the subcarriers determined as discontinuous, and the phase rotation amounts of the respective subcarriers are calculated. The relationship between the frequencies and the thus calculated phase rotation amounts is analyzed by linear regression, and the characteristic coefficient regarding the change rate of the phase rotation amounts with respect to the frequencies is obtained as a parameter needed for distance estimation. In the present configuration, since the linear regression analysis is used for a result of performing the phase addition processing in accordance with continuity between the subcarriers, it is possible to accurately obtain the characteristic coefficient needed for distance estimation even if some subcarrier signals cannot be obtained due to multipath fading. Thus, highly reliable distance estimation is possible even in a situation where multipath fading occurs.

(2) In some embodiments, in the above configuration (1), the distance estimation device further includes a threshold determination unit which calculates a phase deviation cumulative value by using a provisional value of the threshold and determines, as the threshold, the provisional value which falls into a predetermined range including a minimum value of a change amount of the phase deviation cumulative value with respect to the provisional value.

With the above configuration (2), the threshold for evaluating continuity of the phases acquired in the respective subcarriers is determined so as to fall into the predetermined range including the minimum value of the change amount of the phase deviation cumulative value calculated based on a determination result using the threshold. Adopting the thus determined threshold, highly reliable distance estimation is possible.

(3) In some embodiments, in the above configuration (1) or (2), the characteristic coefficient calculation unit calculates the characteristic coefficient by using a least-square method.

With the above configuration (3), the characteristic coefficient needed for distance estimation is obtained from the relationship between the frequencies and the phase rotation amounts of the respective subcarriers by using the least-square method.

(4) In some embodiments, in any one of the above configurations (1) to (3), each of the radio signals is an orthogonal frequency division multiplexing signal.

With the above configuration (4), it is possible to effectively suppress an accuracy decrease due to multipath fading in distance estimation using the orthogonal frequency division multiplexing signal.

(5) In order to solve the above-described problems, a mobile terminal according to at least one embodiment of the present invention includes the distance estimation device according to any one of the above configurations (1) to (4).

With the above configuration (5), since the movable mobile terminal is equipped with the above-described device, it is possible to accurately estimate the distance to the transmission source of the radio signals while suppressing the influence of multipath fading in the mobile terminal.

(6) In some embodiments, in the above configuration (5), the distance estimation device further includes an arrival angle estimation unit which receives the radio signals by not less than two reception units arranged apart from each other and estimates arrival angles of the radio signals based on a phase difference of the radio signals received by not less than the two reception units.

With the above configuration (6), since the distance estimation device includes the arrival angle estimation unit, it is possible to suitably specify the arrival angles of the radio signals in addition to the distance from the mobile terminal to the transmission source of the radio signals. Thus, it is possible to grasp a position on coordinates of the mobile terminal more specifically, enabling high-level position estimation.

(7) In order to solve the above-described problems, a distance estimation method according to at least one embodiment of the present invention is a distance estimation method for estimating a distance to a transmission source of radio signals by receiving the radio signals each including not less than three subcarriers having frequencies different from each other and having oscillation phases equal to each other or with a certain difference, the distance estimation method including a step of respectively acquiring phases of an Mth subcarrier (M is an integer greater than or equal to 1), an (M+1)th subcarrier, and an (M+2)th subcarrier of not less than the three subcarriers, a step of calculating a first phase difference between the Mth subcarrier and the (M+1)th subcarrier, and a second phase difference between the (M+1)th subcarrier and the (M+2)th subcarrier, a step of determining whether a difference between the first phase difference and the second phase difference is not less than a threshold, a step of respectively calculating phase rotation amounts of not less than the three subcarriers by performing phase addition processing of adding 360 deg to a phase of an Nth subcarrier (N is an integer greater than or equal to M+1) of not less than the three subcarriers, if the difference is not less than the threshold, a step of calculating a characteristic coefficient regarding a change rate of the phase rotation amounts with respect to the frequencies by performing a linear regression analysis of a relationship between the phase rotation amounts and the frequencies of not less than the three subcarriers, and a step of estimating the distance based on the characteristic coefficient.

With the above configuration (7), continuity of the phases is determined based on a phase difference between consecutive subcarriers of the plurality of subcarriers included in the radio signals. As a result, phase addition processing is performed on the phases of the subcarriers determined as discontinuous, and the phase rotation amounts of the respective subcarriers is calculated. The relationship between the frequencies and the thus calculated phase rotation amounts is analyzed by linear regression, and the characteristic coefficient regarding the change rate of the phase rotation amounts with respect to the frequencies is obtained as a parameter needed for distance estimation. In the present configuration, since the linear regression analysis is used for a result of performing the phase addition processing in accordance with continuity between the subcarriers, it is possible to accurately obtain the characteristic coefficient needed for distance estimation even if some subcarrier signals cannot be obtained due to multipath fading. Thus, highly reliable distance estimation is possible even in the situation where multipath fading occurs.

(8) In order to solve the above-described problems, a program according to at least one embodiment of the present invention is a program for estimating a distance to a transmission source of radio signals by receiving the radio signals each including not less than three subcarriers having frequencies different from each other and having oscillation phases equal to each other or with a certain difference, the program causing a computer to execute a step of respectively acquiring phases of an Mth subcarrier (M is an integer greater than or equal to 1), an (M+1)th subcarrier, and an (M+2)th subcarrier of not less than the three subcarriers, a step of calculating a first phase difference between the Mth subcarrier and the (M+1)th subcarrier, and a second phase difference between the (M+1)th subcarrier and the (M+2)th subcarrier, a step of determining whether a difference between the first phase difference and the second phase difference is not less than a threshold, a step of respectively calculating phase rotation amounts of not less than the three subcarriers by performing phase addition processing of adding 360 deg to a phase of an Nth subcarrier (N is an integer greater than or equal to M+1) of not less than the three subcarriers, if the difference is not less than the threshold, a step of calculating a characteristic coefficient regarding a change rate of the phase rotation amounts with respect to the frequencies by performing a linear regression analysis of a relationship between the phase rotation amounts and the frequencies of not less than the three subcarriers, and a step of estimating the distance based on the characteristic coefficient.

With the above program (8), continuity of the phases is determined based on a phase difference between consecutive subcarriers of the plurality of subcarriers included in the radio signals. As a result, phase addition processing is performed on the phases of the subcarriers determined as discontinuous, and the phase rotation amounts of the respective subcarriers is calculated. The relationship between the frequencies and the thus calculated phase rotation amounts is analyzed by linear regression, and the characteristic coefficient regarding the change rate of the phase rotation amounts with respect to the frequencies is obtained as a parameter needed for distance estimation. In the present configuration, since the linear regression analysis is used for a result of performing the phase addition processing in accordance with continuity between the subcarriers, it is possible to accurately obtain the characteristic coefficient needed for distance estimation even if some subcarrier signals cannot be obtained due to multipath fading. Thus, highly reliable distance estimation is possible even in the situation where multipath fading occurs.

According to at least one embodiment of the present invention, it is possible to provide a distance estimation device, a mobile terminal, a distance estimation method, and a program capable of suppressing a decrease in distance estimation accuracy due to multipath fading.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
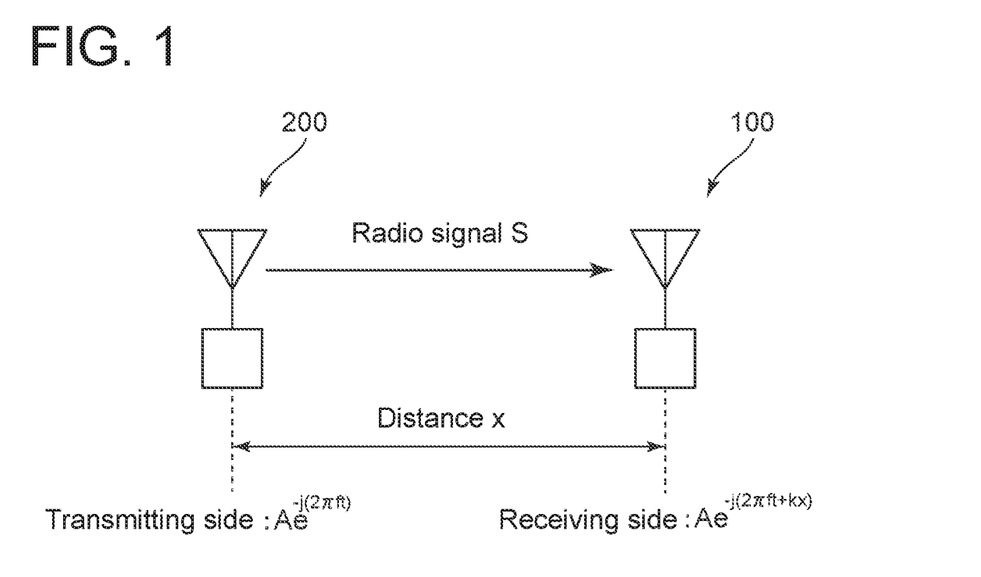
FIG. 1 is a schematic view of a state in which a distance estimation device receives a radio signal according to at least one embodiment of the present invention.

FIG. 1 is a schematic view of a state in which a distance estimation device 100 receives a radio signal according to at least one embodiment of the present invention. The distance estimation device 100 is provided for a mobile terminal (not shown) equipped with a moving body such as a vehicle and can move on a coordinate space via a predetermined path. FIG. 1 shows a state in which the distance estimation device 100 is at a position away by a distance x from a transmitter 200 installed at known coordinates.

The transmitter 200 is, for example, an access point and transmits a radio signal S. The radio signal S propagates through air and is received by the distance estimation device 100. The radio signal S includes a plurality of subcarriers having frequencies different from each other and having oscillation phases equal to each other or with a certain phase difference. In the present embodiment, the radio signal S is an OFDM (Orthogonal Frequency Division Multiplexing) signal and is an OFDM signal which includes a total of 52CH subcarriers set with a frequency spacing of, for example, 312.5 kHz.

The propagation speed of the radio signal S between the distance estimation device 100 and the transmitter 200 is regarded as substantially being equal to a velocity of light c in vacuum ($=3 \times 10^8$ [m/s]).

<Measurement Principle>

The basic measurement principle of a distance estimation method using the radio signal S by the distance estimation device 100 will schematically be described here. As shown in FIG. 1, provided that one subcarrier which is included in the radio signal S transmitted from the transmitter 200 is represented by $Ae^{-j(2\pi ft)}$ by using an amplitude A[m], a frequency f [Hz], a wavenumber k [1/m], and a time t [s], a phase $\Phi$ of the radio signal S received by the distance estimation device 100 is represented by:

$$\Phi = -(2\pi ft + kx) \qquad (1)$$

For the sake of convenience, assume that there is no amplitude attenuation of the radio signal S due to the distance x.

From the second term of equation (1) above, the relation between the distance x and the phase $\Phi$ is given by:

$$x = -\frac{\Phi}{k} = -\frac{\lambda \Phi}{2\pi} = -\frac{c}{2\pi} \cdot \frac{\Phi}{f} \qquad (2)$$

Meanwhile, since the point of origin is not clear in a transparent mode, the problem arises in that the phase $\Phi$ does not represent a phase difference between the distance estimation device 100 and the transmitter 200 in equation (2) above. For the sake of convenience, introducing a phase difference $\Phi_d$ between the distance estimation device 100 and the transmitter 200, which indicates the point of origin, the phase $\Phi$ is a sum of the phase difference $\Phi_d$ and a phase variation amount $\Phi'$ between the distance estimation device 100 and the transmitter 200. Thus, equation (2) above is represented by:

$$x = -\frac{c}{2\pi} \cdot \frac{\Phi' + \Phi_d}{f} \qquad (3)$$

Provided that $\Phi'1$ is a phase variation amount at a frequency f1, and $\Phi'2$ is a phase variation amount at a frequency f2, equation (3) above is represented by:

$$x = -\frac{c}{2\pi} \cdot \frac{\Phi'_1 + \Phi_d}{f_1} \qquad (4\text{-}1)$$

$$x = -\frac{c}{2\pi} \cdot \frac{\Phi'_2 + \Phi_d}{f_2} \qquad (4\text{-}2)$$

Deleting the phase difference $\Phi_d$ from two equations above and summarizing the distance x, the following equation is obtained:

$$x = -\frac{c}{2\pi} \cdot \frac{\Phi'_2 - \Phi'_1}{f_2 - f_1} \cong -\frac{c}{2\pi} \cdot \frac{\partial \Phi'}{\partial f} \qquad (5)$$

According to equation (5) above, the distance x is calculated by measuring the change rate of the phase with respect to the frequency f (that is, the phase variation amount between the subcarriers) even if the phase difference $\Phi_d$ between the distance estimation device 100 and the transmitter 200 is unknown.

Figure 2:
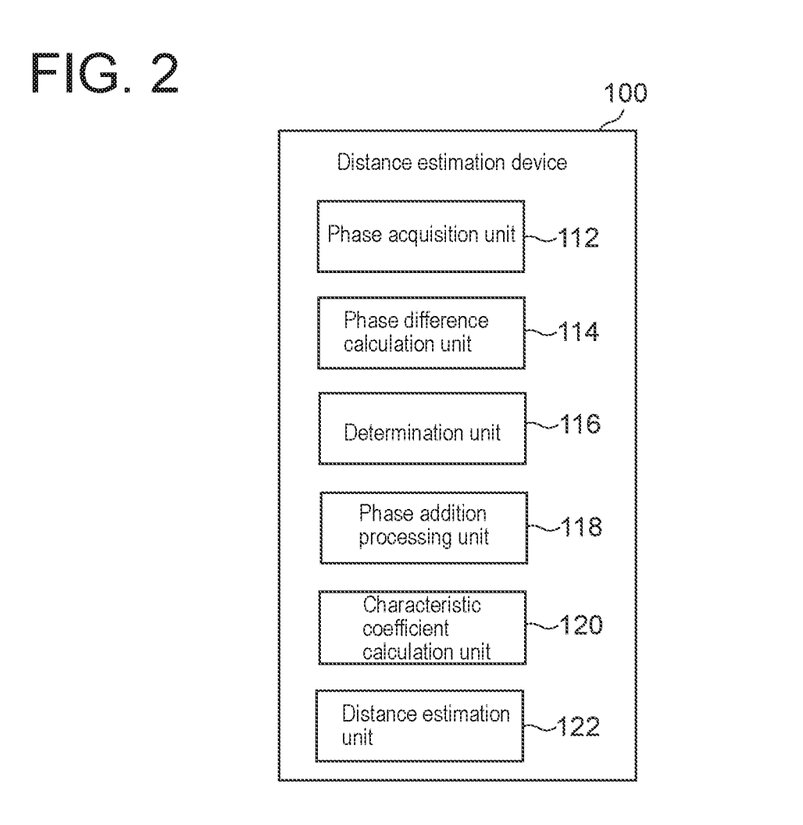
FIG. 2 is a block diagram showing the internal configuration of the distance estimation device in FIG. 1.
Figure 3:
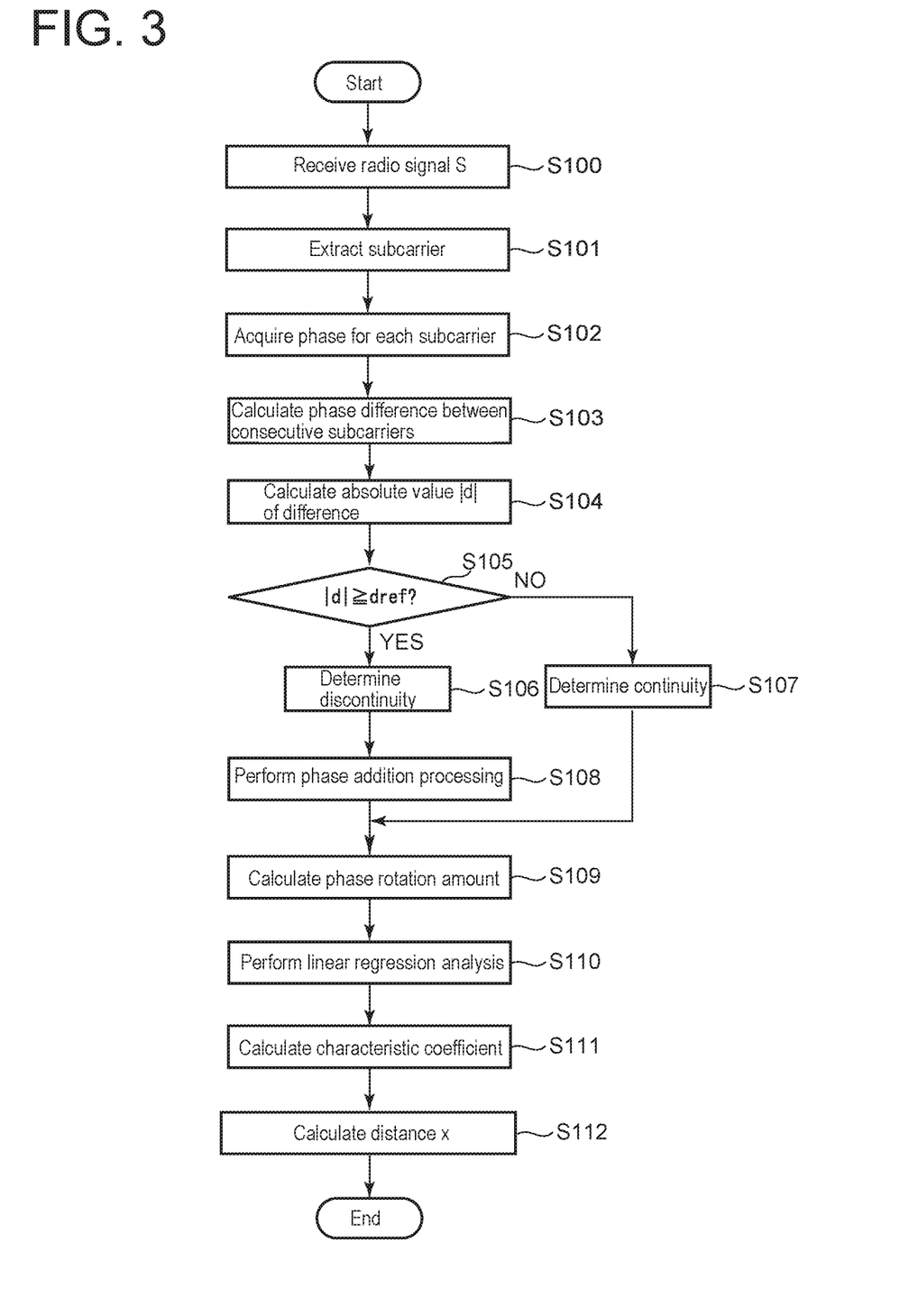
FIG. 3 is a flowchart showing steps of a distance estimation method performed by the distance estimation device in FIG. 2.

Subsequently, specific embodiments of the distance estimation method based on the aforementioned measurement principle will be described. FIG. 2 is a block diagram showing the internal configuration of the distance estimation device 100 in FIG. 1. FIG. 3 is a flowchart showing steps of the distance estimation method performed by the distance estimation device 100 in FIG. 2.

In the embodiment shown in FIG. 2, the distance estimation device 100 includes a phase acquisition unit 112, a phase difference calculation unit 114, a determination unit 116, a phase addition processing unit 118, a characteristic coefficient calculation unit 120, and a distance estimation unit 122. The specific function of each of the constituent elements of the distance estimation device 100 and the distance estimation method performed by the constituent elements will be described below with reference to FIG. 3.

First, the distance estimation device 100 receives the radio signal S which is the OFDM signal transmitted from the transmitter 200 (step S100) and extracts each subcarrier included in the radio signal S (step S101). The radio signal S includes a plurality of subcarriers having frequencies different from each other and having oscillation phases equal to each other. In the present embodiment, the radio signal S includes the total of 52 subcarriers which include frequencies distributed at regular intervals and different from each other. In step S101, the distance estimation device 100 extracts each of the subcarriers. When each of the subcarriers included in the radio signal S is individually mentioned in the description below, the subcarriers are referred to as the first subcarrier, the second subcarrier, . . . , the 52nd subcarrier in this order from a low frequency side.

Figure 4:
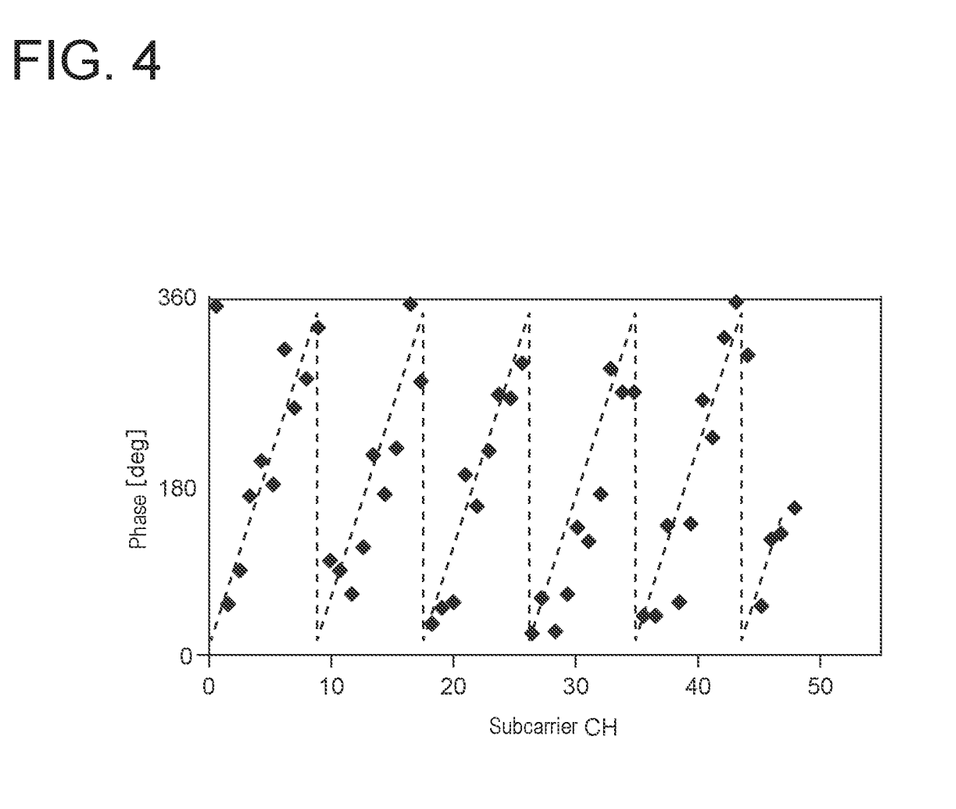
FIG. 4 is a graph showing an example of a relationship between each subcarrier and a phase acquired in step S102 of FIG. 3.

Subsequently, the phase acquisition unit 112 acquires the phase $\Phi$ of each of the subcarriers extracted in step S101. That is, the phase acquisition unit 112 respectively acquires phases $\Phi 1$, $\Phi 2$, . . . , and $\Phi 52$ corresponding to the first subcarrier, the second subcarrier, . . . , the 52nd subcarrier. FIG. 4 is a graph showing an example of a relationship between each of the subcarriers and the phase $\Phi$ acquired in step S102 of FIG. 3.

Subsequently, the phase difference calculation unit 114 calculates a phase difference $\Delta\Phi$ between the consecutive subcarriers based on the phase $\Phi$ of each of the subcarriers acquired in step S102 (step S103). The consecutive subcarriers refer to a combination of adjacent subcarriers of the first subcarrier, the second subcarrier, . . . , the 52nd subcarrier (for example, a combination of the first subcarrier and the second subcarrier, a combination of the second subcarrier and the third subcarrier, . . . ). In step S103, the phase difference calculation unit 114 calculates each phase difference for the corresponding combination of the consecutive subcarriers.

Subsequently, the determination unit 116 calculates an absolute value |d| of a difference for a combination of consecutive first phase difference $\Delta\Phi 1$ and second phase difference $\Delta\Phi 2$ of the phase differences between the consecutive subcarriers calculated in step S103 (step S104), and determines whether the absolute value |d| of each difference is not less than a threshold dref (step S105). Using an arbitrary integer M greater than or equal to 1, the first phase difference $\Delta\Phi 1$ is the phase difference between consecutive Mth subcarrier and (M+1)th subcarrier, and the second phase difference $\Delta\Phi 2$ is the phase difference between consecutive (M+1)th subcarrier and (M+2)th subcarrier.

In step S105, the determination unit 116 calculates the absolute value |d| of the difference for the combination of the consecutive first phase difference $\Delta\Phi 1$ and second phase difference $\Delta\Phi 2$ to be compared with the threshold dref. The threshold dref is a reference value for determining continuity/discontinuity of the phase $\Phi$ between the consecutive subcarriers and is appropriately set in a range from 0 deg to 360 deg. In step S105, if the absolute value |d| of the difference is not less than the threshold dref, the determination unit 116 determines that the phase between the subcarriers corresponding to the absolute value |d| of the difference is discontinuous (step S106). On the other hand, if the absolute value |d| of the difference is less than the threshold dref, the determination unit 116 determines that the phase between the subcarriers corresponding to the absolute value |d| of the difference is discontinuous (step S107).

Figure 5:
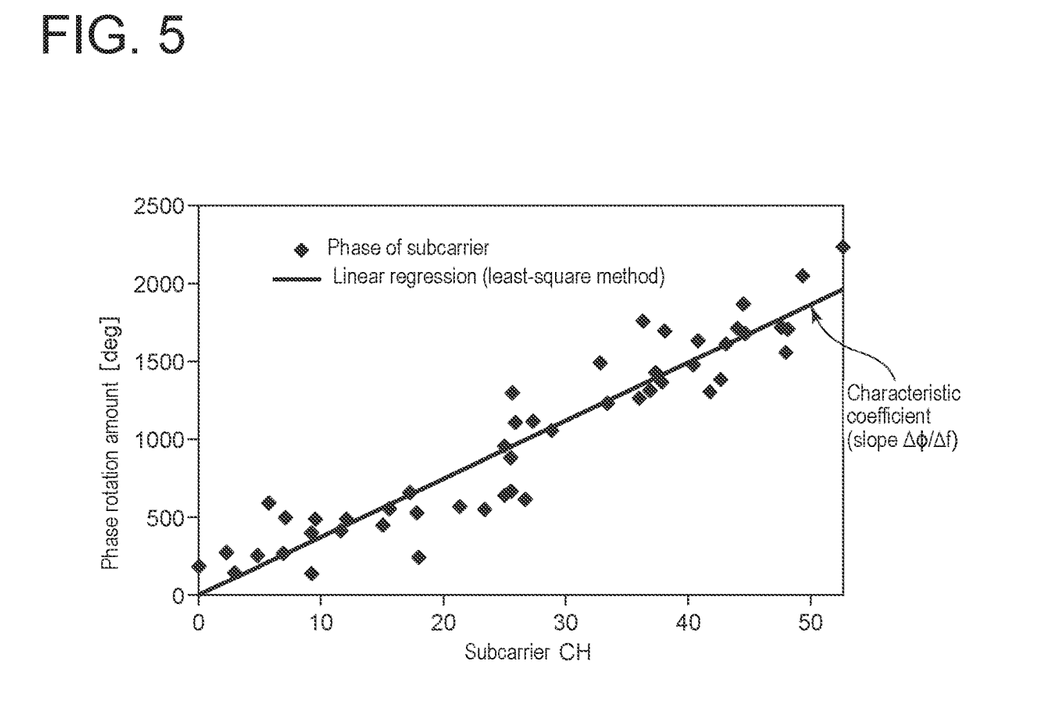
FIG. 5 is a graph showing a distribution example of a phase rotation amount indicating a result of performing phase addition processing on a phase variation shown in FIG. 4.

Subsequently, the phase addition processing unit 118 performs phase addition processing in accordance with a determination result in step S105 (step S108) and calculates a phase rotation amount of each of the subcarriers (step S109). For example, if the absolute value |d| of the difference between the first phase difference $\Delta\Phi 1$ between the Mth subcarrier and the (M+1)th subcarrier, and the second phase difference $\Delta\Phi 2$ between the (M+1)th subcarrier and the (M+2)th subcarrier is not less than the threshold dref, the phase addition processing unit 118 performs phase addition processing of adding 360 deg to the phase $\Phi$ of the Nth subcarrier (N is an integer greater than or equal to M+1) of the radio signal S. That is, the phase addition processing unit 118 performs the phase addition processing on the phase $\Phi$ of each of the subcarriers on a higher frequency side than the Nth subcarrier. FIG. 5 is a graph showing a distribution example of the phase rotation amount indicating a result of performing the phase addition processing on a phase variation shown in FIG. 4.

Subsequently, the characteristic coefficient calculation unit 120 performs a linear regression analysis on the phase rotation amount of each of the subcarriers calculated in step S109 (step S110) and calculates a characteristic coefficient regarding a change rate of the phase rotation amount with respect to the frequency (step S111). In the embodiment shown in FIG. 5, a linear function based on the phase rotation amount of each of the subcarriers is obtained by a least-square method as an example of the linear regression analysis. In this case, the characteristic coefficient calculated in step S111 is obtained as the slope of the linear function.

Subsequently, the distance estimation unit 122 estimates the distance x to the transmitter 200 based on the characteristic coefficient (the slope of the linear function) calculated in step S111 (step S112). As described above, since the characteristic coefficient calculated in step S111 is the change rate of the phase rotation amount with respect to the frequency, the distance estimation unit 122 calculates the distance x by substituting the characteristic coefficient as $(d\Phi'/df)$ on the right-hand side of equation (5) above.

Thus, in the present embodiment, since the linear regression analysis is used for a result of performing the phase addition processing in accordance with continuity between the subcarriers, it is possible to accurately obtain the characteristic coefficient needed for distance estimation even if some subcarrier signals cannot be obtained due to multipath fading. Thus, highly reliable distance estimation is possible even in a situation where multipath fading occurs.

Figure 6:
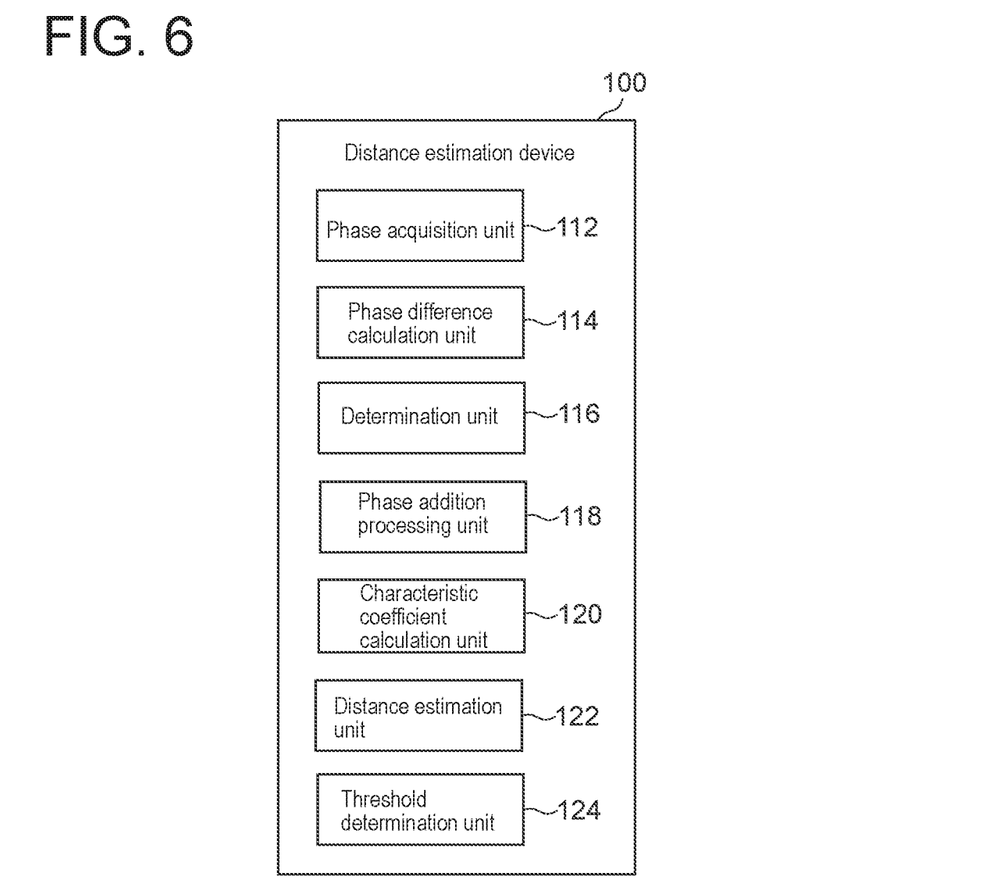
FIG. 6 is a modified example of FIG. 2.

FIG. 6 is a modified example of FIG. 2. The embodiment shown in FIG. 6 is different from FIG. 2 in that the distance estimation device 100 further includes a threshold determination unit 124. The threshold determination unit is a constituent element for determining the threshold dref used as a determination reference value in step S105 of FIG. 3.

Figure 7:
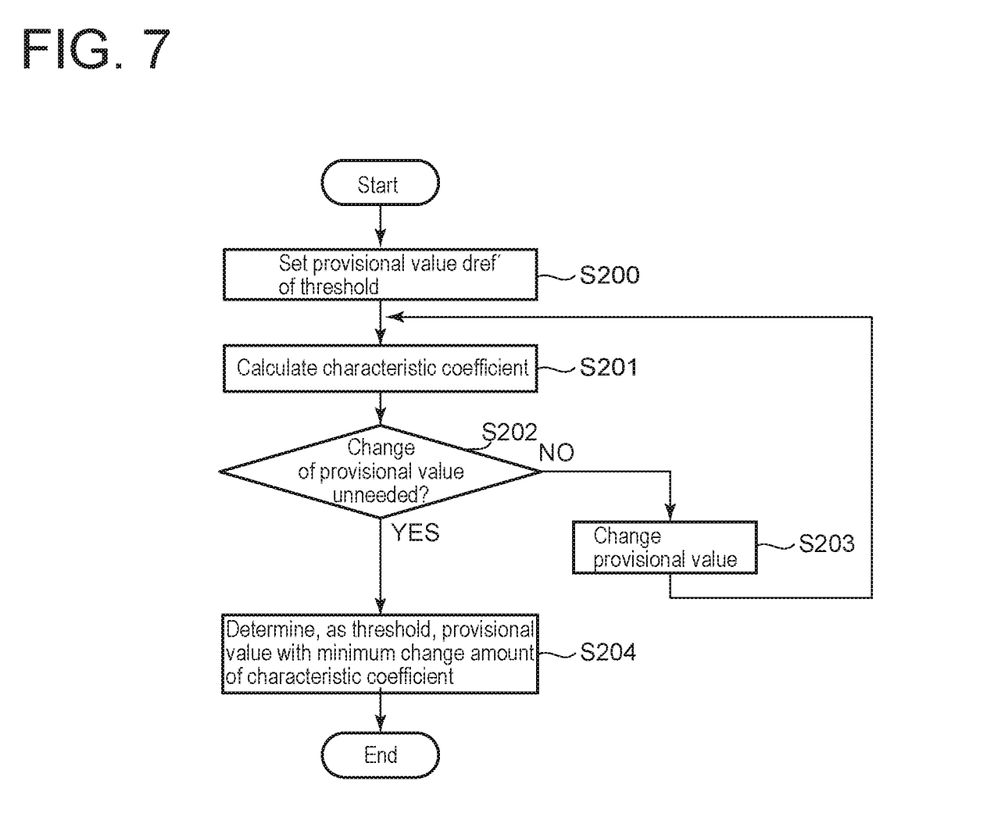
FIG. 7 is a flowchart showing steps of a threshold determination method by a threshold determination unit in FIG. 6.

A method of determining the threshold dref by the threshold determination unit 124 will be described in detail here. FIG. 7 is a flowchart showing steps of the method of determining the threshold dref by the threshold determination unit 124 in FIG. 6.

First, the threshold determination unit 124 sets a provisional value dref' of the threshold dref (step S200). The provisional value dref can arbitrarily be selected in the range of 0 deg to 360 deg. However, first, for example, 5 deg is selected as an initial value of the provisional value dref' here.

Subsequently, the threshold determination unit 124 calculates a phase deviation cumulative value by using the provisional value dref' set in step S200 (step S201). The phase deviation cumulative value is calculated as follows: (i) First, least-square method processing is applied to the phase $\Phi$ of each of the 52CH subcarriers, thereby obtaining an approximate function (for example, provided that a linear approximate function $\Phi=af+b$ (a is a slope, b is an intercept), the slope a is obtained by a covariance value/a variance value by using the covariance value and the variance value of the phase $\Phi$ of each of the 52CH subcarriers). (ii) Subsequently, regarding each of the 52CH subcarriers, an absolute value $(=|\Phi-\Phi'|)$ of a phase deviation between the phase $\Phi$ calculated by using the approximate function obtained in (i) and a phase $\Phi'$ of each of the subcarriers actually measured is calculated (for example, provided that f1 is the 1CH frequency, the phase $\Phi 1$ corresponding to 1CH is calculated as $\Phi 1=a \cdot f1+b$ by using the linear approximate function $\Phi=af+b$ obtained from the least-square method. Then, provided that $\Phi 1'$ is a measurement phase of the 1CH subcarrier, an absolute value of a phase deviation corresponding to 1CH is obtained as $|\Phi 1-\Phi 1'|$). (iii) Subsequently, the phase deviation cumulative value is obtained by accumulating the absolute values of the phase deviations of 52CH calculated in (ii).

Subsequently, the threshold determination unit 124 determines whether the provisional value dref' needs to be changed (step S202). More specifically, the threshold determination unit 124 determines whether calculation of the phase deviation cumulative value is performed sufficiently while changing the provisional value dref' in the range of 0 deg to 360 deg. For example, since the provisional value dref' is not changed sufficiently in the range of 0 deg to 360 deg if only the phase deviation cumulative value in a case in which the provisional value dref' is the initial value 5 deg is calculated (step S202: NO), the threshold determination unit 124 changes the provisional value dref' to a next value (step S203) and calculates the phase deviation cumulative value again based on the changed provisional value dref'.

The change of the provisional value dref' and calculation of the phase deviation cumulative value described above are repeated until the provisional value dref' is sufficiently changed in the range of 0 deg to 360 deg. For example, in the case in which the provisional value dref' is the initial value 5 deg, the change of the provisional value dref' and calculation of the phase deviation cumulative value described above are repeated before reaching 360 deg while adding by 5 deg. As a result, if each phase deviation cumulative value corresponding to the provisional value dref' is calculated in the range of 0 deg to 360 deg, (step S202: YES), the threshold determination unit 124 determines, as a threshold, the provisional value dref' which falls into a predetermined range including a minimum value of a change amount of the phase deviation cumulative value with respect to the provisional value dref' (step S204).

Figure 8:
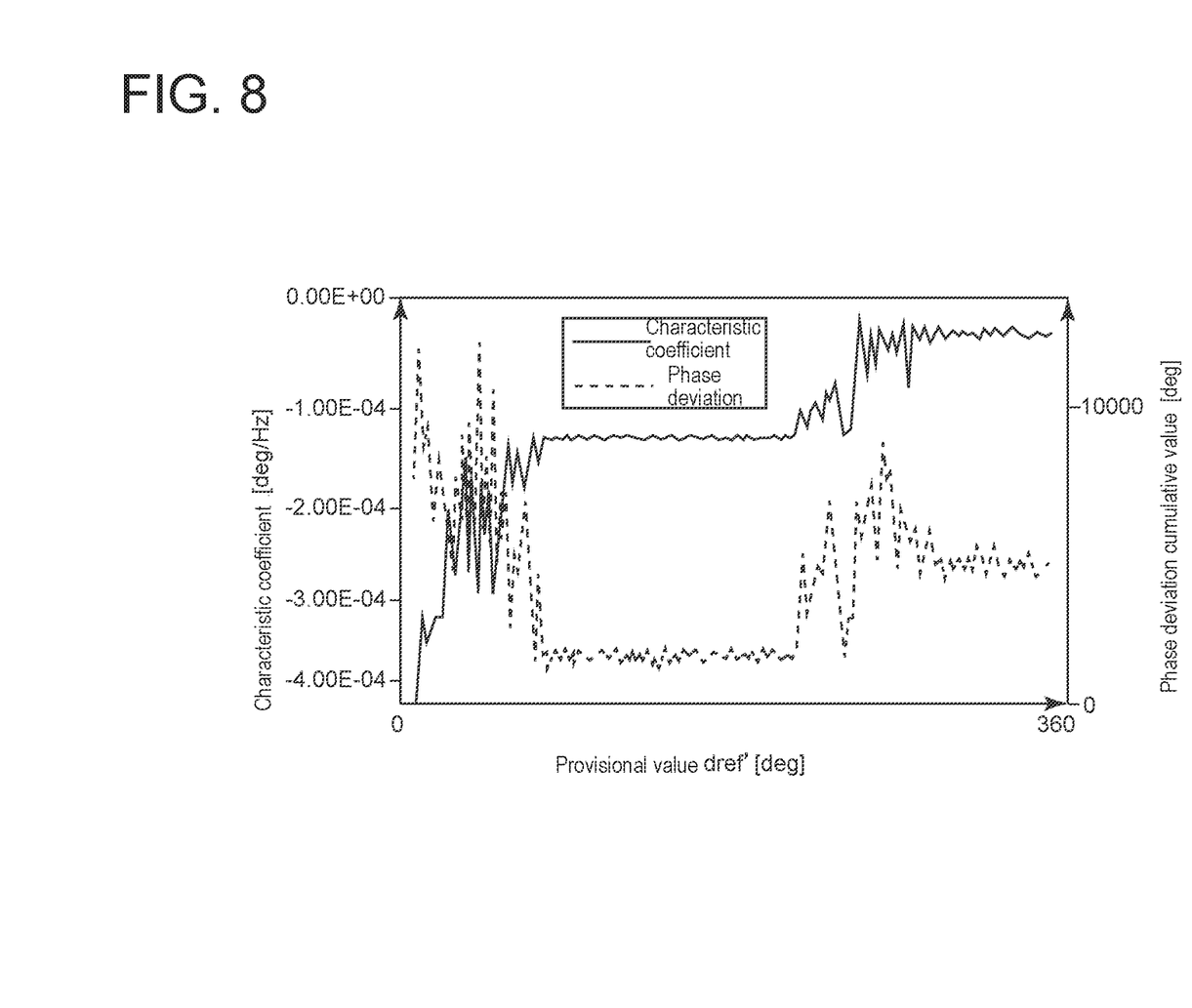
FIG. 8 is a graph showing a calculation example of a phase deviation cumulative value with respect to a provisional value.

FIG. 8 is a graph showing a calculation example of the phase deviation cumulative value with respect to the provisional value dref'. FIG. 8 plots the phase deviation cumulative value calculated with each provisional value when the provisional value dref' is changed in the range from 5 deg to 355 deg (FIG. 8 shows, for a reference, the characteristic coefficient calculated with respect to each provisional value dray). In this example, the phase deviation cumulative value is small in the range where the provisional value is 60 to 200 deg, and thus the provisional value falling into the range is determined as the final threshold dref. In the present embodiment, distance estimation is performed by using the thus determined threshold dref, enabling highly reliable distance estimation.

Figure 9:
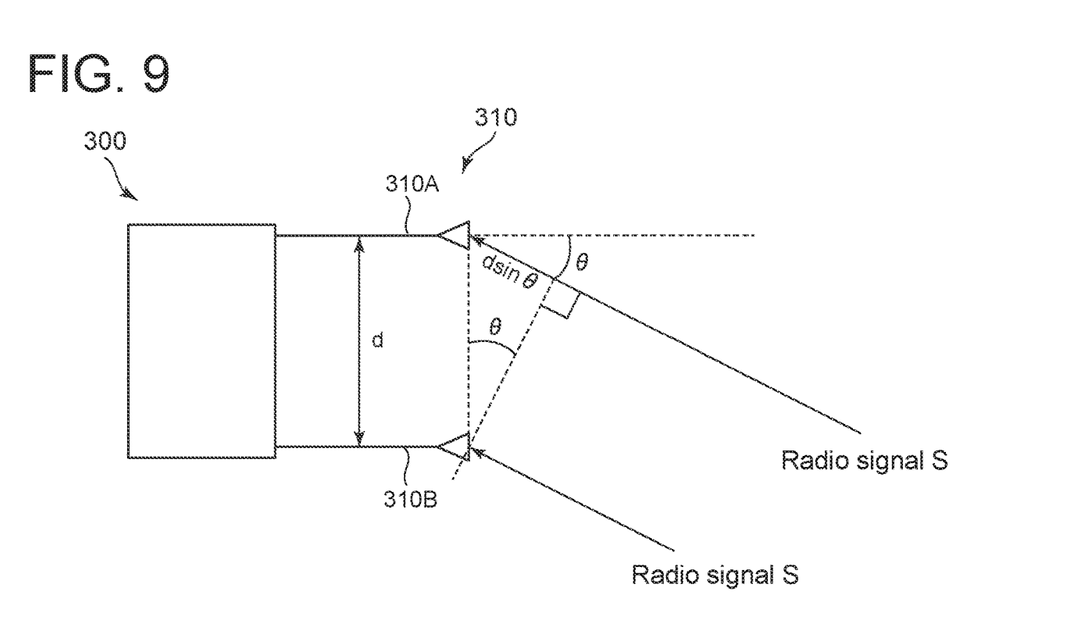
FIG. 9 is a schematic view showing an example of a mobile terminal according to at least one embodiment of the present invention.

Subsequently, an application of a mobile terminal 300 which includes the distance estimation device 100 having the above-described configuration will be described. FIG. 9 is a schematic view showing an example of the mobile terminal 300 according to at least one embodiment of the present invention.

The mobile terminal 300 includes an arrival angle estimation unit 310 in addition to the aforementioned distance estimation device 100 (not shown in FIG. 9). As shown in FIG. 9, the arrival angle estimation unit 310 estimates arrival angles $\theta$ of the radio signals S received by the mobile terminal 300. Hardware of the arrival angle estimation unit 310 includes not less than two antenna elements arranged at predetermined intervals. FIG. 9 shows a first antenna element 310A and a second antenna element 310B respectively installed at positions apart from each other by a predetermined distance d on a casing (not shown) of the mobile terminal 300.

Each of the first antenna element 310A and the second antenna element 310B functions as the arrival angle estimation unit 310 and may also has a function of receiving a corresponding one of the radio signals S by the aforementioned distance estimation device 100.

As shown in FIG. 9. a situation is assumed in which the radio signals S obtained by the mobile terminal 300 are received at the arrival angles $\theta$ with respect to the first antenna element 310A and the second antenna element 310B. In this case, a wavelength $\lambda$ of each of the radio signals S, and the phase difference $\Phi$ of the radio signals S received by the first antenna element 310A and the second antenna element 310B are represented by:

$$\Phi=(2\pi/\lambda)d \sin \theta \qquad (6)$$

Therefore, varying equation (6) above, each of the arrival angles $\theta$ is obtained by:

$$\theta=\sin^{-1}((\Phi/\lambda)/(2\pi d)) \qquad (7)$$

Since the mobile terminal 300 includes the arrival angle estimation unit 310, it is possible to specify the arrival angles of the radio signals S with respect to the mobile terminal 300, in addition to distance estimation by the distance estimation device 100. Thus, it is possible to grasp a position on space coordinates of the mobile terminal 300 more specifically, enabling high-level position estimation.

Figure 10:
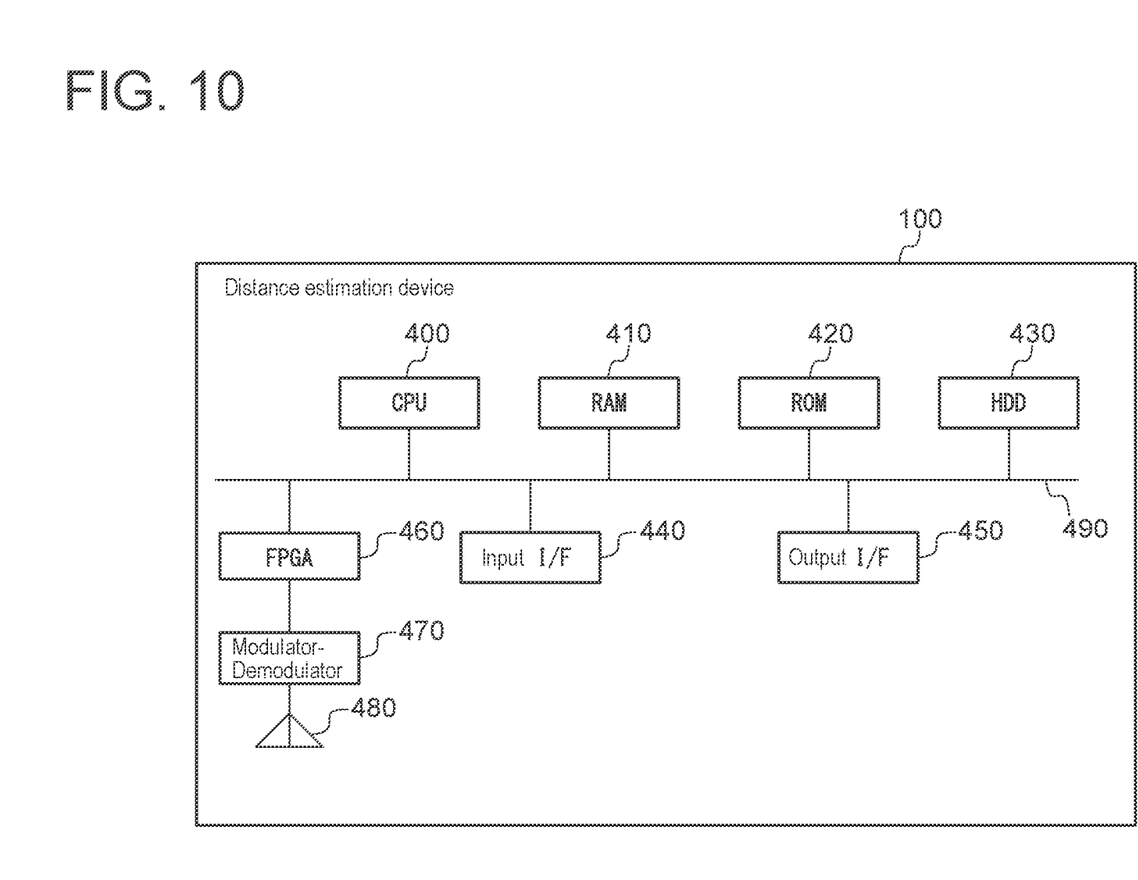
FIG. 10 is a schematic configuration diagram showing the hardware configuration of the distance estimation device in FIG. 1.

The distance estimation device 100 having the above-described configuration may be configured as an electronic computation device such as a computer. More specifically, as shown in FIG. 10, the distance estimation device 100 includes a CPU 400 (Central Processing unit), a RAM 410 (Random Access Memory), a ROM 420 (Read Only Memory), an HDD 430 (Hard Disk Drive), an input I/F 440, an output I/F 450, an FPGA 460, a modulator-demodulator 470, and a receiving antenna 480, which are connected to each other via a bus 490.

The hardware configuration of the distance estimation device 100 is not limited to the above.

Moreover, a program for implementing the function of the distance estimation device 100 (distance estimation program) may be stored in a cloud or a storage medium. Then, the distance estimation device 100 includes an external communication device such as a wireless LAN communication device, for example, a 4G, 5G line communication device, Wi-Fi (registered trademark), or the like, and the CPU 400 may read a program from the cloud via the external communication device and load the program to the RAM 410 to execute the program. The distance estimation device 100 also includes a driver for reading data of the storage medium, and the CPU 400 may read a program from the storage medium and load the program to the RAM 410 to execute the program. Any type of storage medium can be used. Various storage media according to a program capacity such as an SD card, a USB memory, and an external HDD can be used.

As described above, according to the above-described embodiments, it is possible to provide a distance estimation device, a mobile terminal, a distance estimation method, and a program capable of suppressing a decrease in distance estimation accuracy due to multipath fading.

INDUSTRIAL APPLICABILITY

At least one embodiment of the present invention can be used for a distance estimation device for estimating a distance to a transmission source of a radio signal, a mobile terminal equipped with the distance estimation device, a distance estimation method, and a program.

The invention claimed is:

1. A distance estimation device for estimating a distance to a transmission source of radio signals by receiving the radio signals each including not less than three subcarriers having frequencies different from each other and having oscillation phases equal to each other or with a certain difference, the distance estimation device comprising:
   a phase acquisition unit which respectively acquires phases of an Mth subcarrier (M is an integer greater than or equal to 1), an (M+1)th subcarrier, and an (M+2)th subcarrier of not less than the three subcarriers;
   a phase difference calculation unit which calculates, based on an acquisition result of the phase acquisition unit, a first phase difference between the Mth subcarrier and the (M+1)th subcarrier, and a second phase difference between the (M+1)th subcarrier and the (M+2)th subcarrier;
   a determination unit which determines whether a difference between the first phase difference and the second phase difference is not less than a threshold;
   a phase addition processing unit which respectively calculates phase rotation amounts of not less than the three subcarriers by performing phase addition processing of adding 360 deg to a phase of an Nth subcarrier (N is an integer greater than or equal to M+1) of not less than the three subcarriers as a result of the difference being not less than the threshold;
   a characteristic coefficient calculation unit which calculates a characteristic coefficient regarding a change rate of the phase rotation amounts with respect to the frequencies by performing a linear regression analysis of a relationship between the phase rotation amounts and the frequencies of not less than the three subcarriers; and
   a distance estimation unit which estimates the distance based on the characteristic coefficient.

2. The distance estimation device according to claim 1, further comprising a threshold determination unit which calculates a phase deviation cumulative value by using a provisional value of the threshold and determines, as the threshold, the provisional value which falls into a predetermined range including a minimum value of a change amount of the phase deviation cumulative value with respect to the provisional value.

3. The distance estimation device according to claim 1, wherein the characteristic coefficient calculation unit calculates the characteristic coefficient by using a least-square method.

4. The distance estimation device according to claim 1, wherein each of the radio signals is an orthogonal frequency division multiplexing signal.

5. A mobile terminal comprising the distance estimation device according to claim 1.

6. The mobile terminal according to claim 5, further comprising an arrival angle estimation unit which receives the radio signals by not less than two reception units arranged apart from each other and estimates arrival angles of the radio signals based on a phase difference of the radio signals received by not less than the two reception units.

7. A distance estimation method for estimating a distance to a transmission source of radio signals by receiving the radio signals each including not less than three subcarriers having frequencies different from each other and having oscillation phases equal to each other or with a certain difference, the distance estimation method comprising:
   a step of respectively acquiring phases of an Mth subcarrier (M is an integer greater than or equal to 1), an (M+1)th subcarrier, and an (M+2)th subcarrier of not less than the three subcarriers;
   a step of calculating a first phase difference between the Mth subcarrier and the (M+1)th subcarrier, and a second phase difference between the (M+1)th subcarrier and the (M+2)th subcarrier;
   a step of determining whether a difference between the first phase difference and the second phase difference is not less than a threshold;
   a step of respectively calculating phase rotation amounts of not less than the three subcarriers by performing phase addition processing of adding 360 deg to a phase of an Nth subcarrier (N is an integer greater than or equal to M+1) of not less than the three subcarriers as a result of the difference being not less than the threshold;
   a step of calculating a characteristic coefficient regarding a change rate of the phase rotation amounts with respect to the frequencies by performing a linear regression analysis of a relationship between the phase rotation amounts and the frequencies of not less than the three subcarriers; and
   a step of estimating the distance based on the characteristic coefficient.

8. A program for estimating a distance to a transmission source of radio signals by receiving the radio signals each including not less than three subcarriers having frequencies different from each other and having oscillation phases equal to each other or with a certain difference, the program causing a computer to execute:

a step of respectively acquiring phases of an Mth subcarrier (M is an integer greater than or equal to 1), an (M+1)th subcarrier, and an (M+2)th subcarrier of not less than the three subcarriers;

a step of calculating a first phase difference between the Mth subcarrier and the (M+1)th subcarrier, and a second phase difference between the (M+1)th subcarrier and the (M+2)th subcarrier;

a step of determining whether a difference between the first phase difference and the second phase difference is not less than a threshold;

a step of respectively calculating phase rotation amounts of not less than the three subcarriers by performing phase addition processing of adding 360 deg to a phase of an Nth subcarrier (N is an integer greater than or equal to M+1) of not less than the three subcarriers as a result of the difference being not less than the threshold;

a step of calculating a characteristic coefficient regarding a change rate of the phase rotation amounts with respect to the frequencies by performing a linear regression analysis of a relationship between the phase rotation amounts and the frequencies of not less than the three subcarriers; and a step of estimating the distance based on the characteristic coefficient.

* * * * *